Jan. 27, 1948.                V. E. PRATT ET AL                2,435,099
                        DOCUMENT CAMERA AND PRINTER
                    Filed Oct. 28, 1943        10 Sheets-Sheet 1
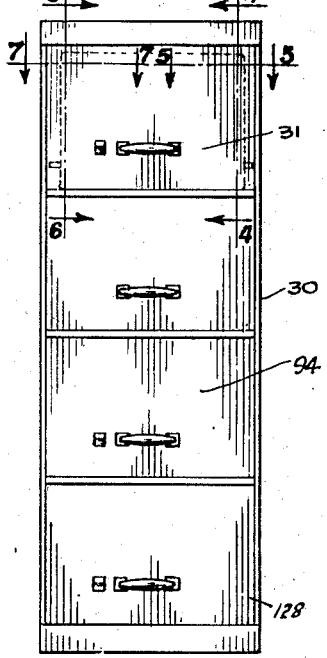
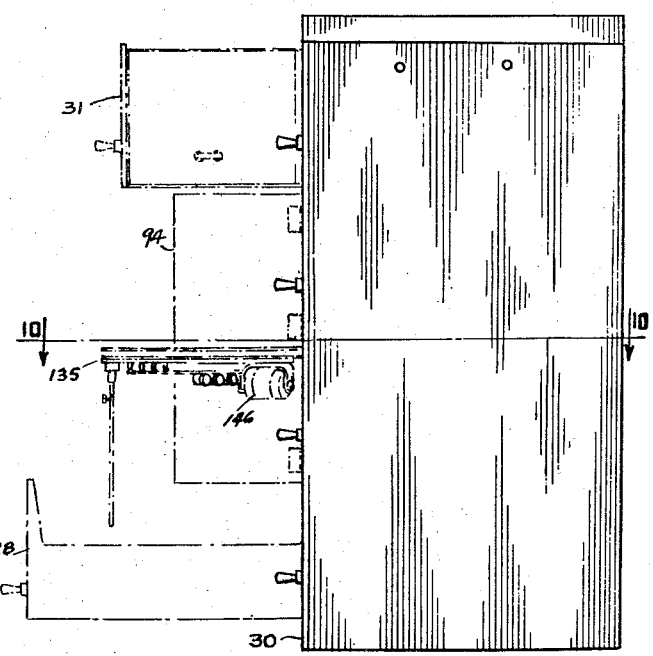
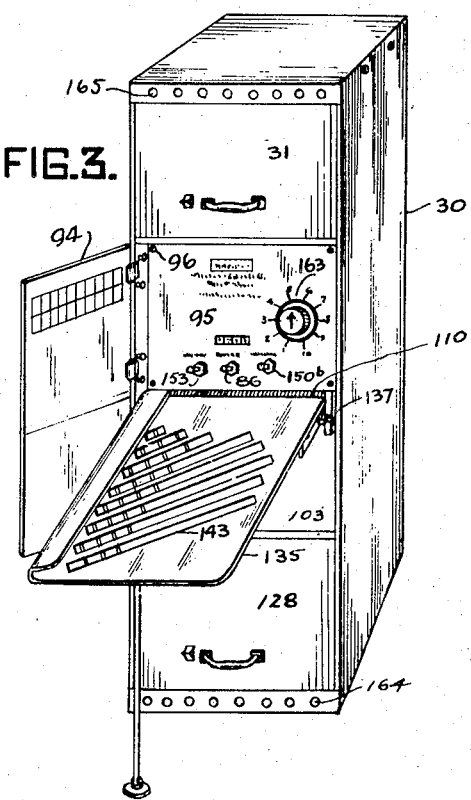
INVENTORS.
VERNEUR E. PRATT
GEORGE F. GRAY
BY
Van Deventer + Grier
ATTORNEYS.

Jan. 27, 1948. V. E. PRATT ET AL 2,435,099
DOCUMENT CAMERA AND PRINTER
Filed Oct. 28, 1943 10 Sheets-Sheet 2

INVENTORS.
VERNEUR E. PRATT
GEORGE F. GRAY
BY
Van Deventer & Grier
ATTORNEYS.

Jan. 27, 1948. V. E. PRATT ET AL 2,435,099
DOCUMENT CAMERA AND PRINTER
Filed Oct. 28, 1943 10 Sheets-Sheet 3

INVENTORS.
VERNEUR E. PRATT
GEORGE F. GRAY
BY
Van Deventer & Grier
ATTORNEYS.

Jan. 27, 1948.  V. E. PRATT ET AL  2,435,099
DOCUMENT CAMERA AND PRINTER
Filed Oct. 28, 1943  10 Sheets-Sheet 5

INVENTORS.
VERNEUR E. PRATT
GEORGE F. GRAY
BY
ATTORNEYS.

Jan. 27, 1948. V. E. PRATT ET AL 2,435,099
DOCUMENT CAMERA AND PRINTER
Filed Oct. 28, 1943 10 Sheets-Sheet 6

INVENTORS.
VERNEUR E. PRATT
GEORGE F. GRAY
BY
ATTORNEYS.

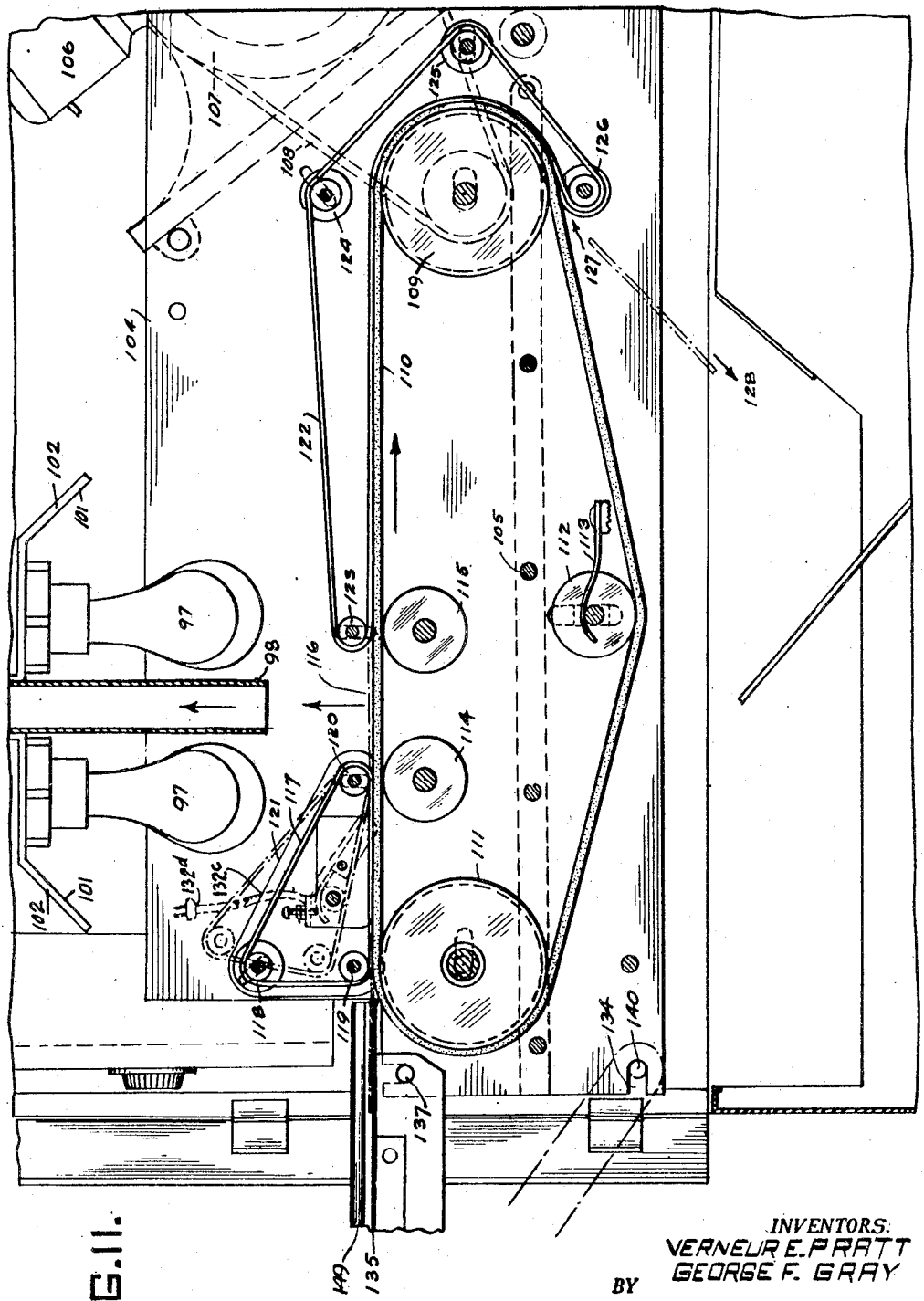

INVENTORS.
VERNEUR E. PRATT
GEORGE F. GRAY
BY
Vandeventer & Grier
ATTORNEYS.

Jan. 27, 1948.                V. E. PRATT ET AL                2,435,099
                        DOCUMENT CAMERA AND PRINTER
                    Filed Oct. 28, 1943        10 Sheets—Sheet 9
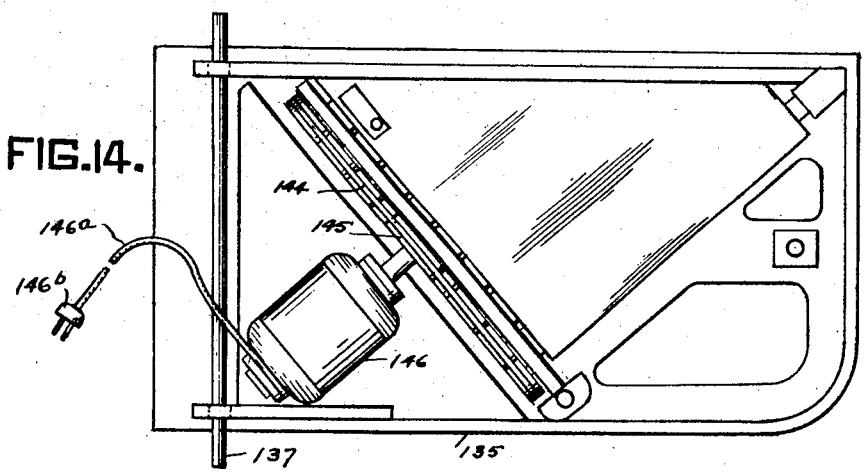
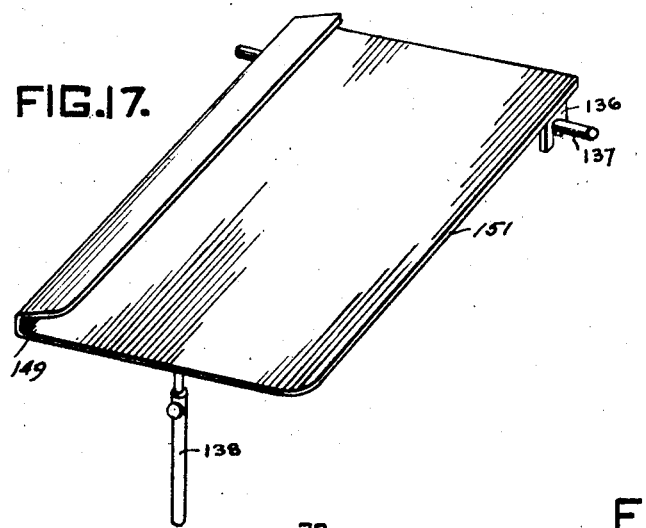
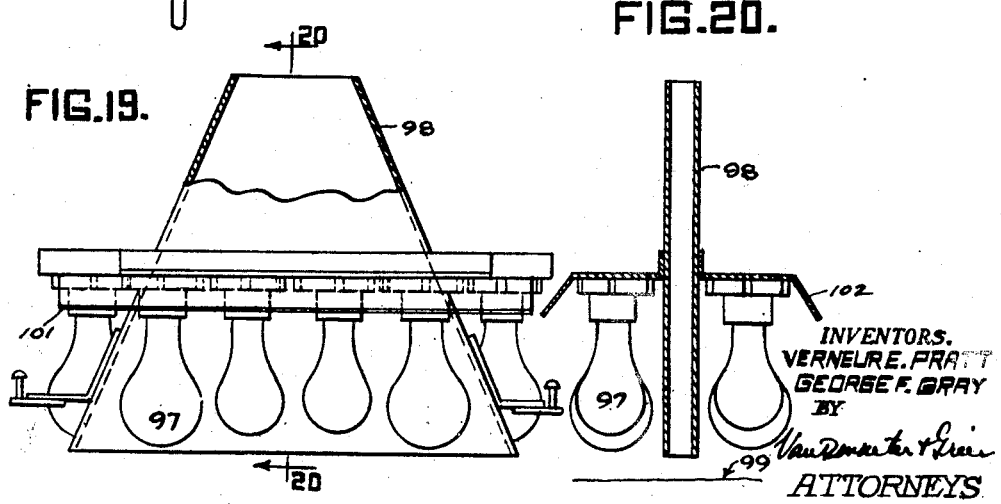
INVENTORS.
VERNEUR E. PRATT
GEORGE F. GRAY
BY
*Van Demeter & Given*
ATTORNEYS

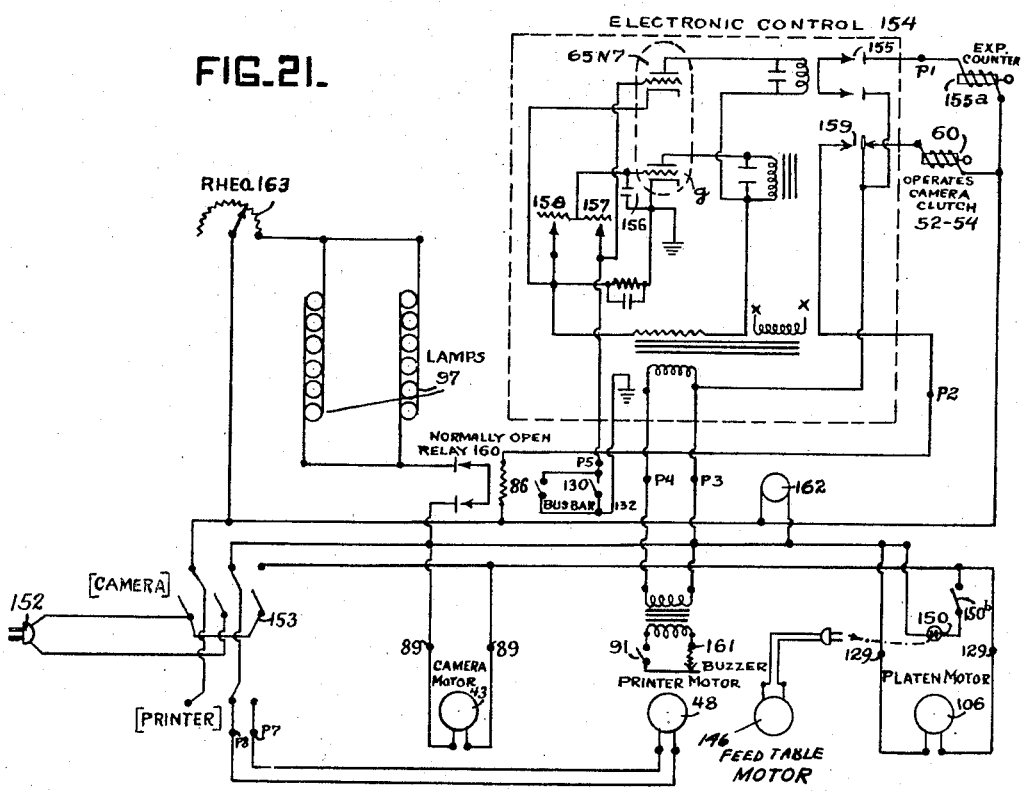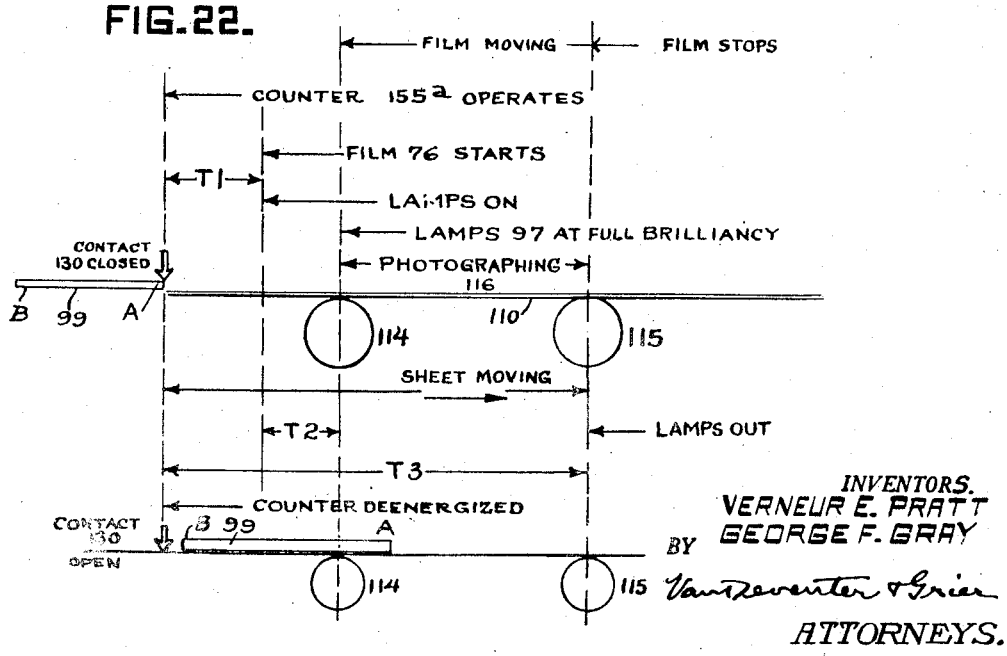

Patented Jan. 27, 1948

2,435,099

UNITED STATES PATENT OFFICE 2,435,099

DOCUMENT CAMERA AND PRINTER

Verneur E. Pratt and George F. Gray, Norwalk, Conn.; said Gray assignor to said Pratt Application October 28, 1943, Serial No. 507,939

12 Claims. (Cl. 88—24)

This invention relates to photographic devices and more particularly to a combined camera and positive film printer in combination with document feeding mechanism mounted in a framework or cabinet which may match any desired piece of furniture, such as the usual three drawer filing cabinets in common use, all said devices forming a combination of detachable and removable units ready for use without further assembly or connection when in the cabinet.

The device herein described, by way of disclosing a preferred embodiment of the invention, is particularly adapted to the production of what is commonly termed "microfilm" and employs standard 16 or 35 mm. film either perforated or unperforated along its edges, and on which is photographed checks, letters or any other papers or objects that can be fed into the machine. Each object such, for example, as a letter (hereinafter termed the sheet), is automatically positioned below the camera lens, an exposure made, the sheet discharged to a magazine, a second sheet positioned in the field of the lens, an exposure made, and so on, as long as the machine is in operation, the only attendance necessary being the placing of the sheets on the feed table, all other operations being fully automatic and the sheet and film being in continuous motion while the camera is in operation. Such devices are often termed "continuous flow cameras."

Many of the devices heretofore designed for this purpose consisted of a feeder, some means for positioning the sheet in the field of the lens, and a camera to photograph the sheet so positioned. These separate devices were in some cases independently controlled, requiring the operator to manipulate various switches or the like when photographing each sheet, or when connected together for automatic operation, the camera mechanism was operated by belts, gearing or the like from the same source of power that operated the feeder or the sheet positioning means, (hereinafter termed the platen mechanism).

In connection with photographs of ordinary size, or where the reduction is slight, inaccuracies in the relative positioning of the film and sheet brought about by belt slippage, gear backlash and other inequalities in the mechanical power transmitting means between the parts, could be ignored, but in microfilming, these inequalities cause grave defects because of the great optical reduction present which greatly magnifies any irregularity present.

An object of the invention is to provide a device in which defects due to the aforementioned causes are eliminated and registry is greatly improved as compared with other methods of interconnecting the camera with the other parts. This invention also provides a simple and cheap method of producing positive prints from a negative film, in which the necessary readjustment of the parts of the camera to change it from a straight photographic camera to a contact printer are reduced to a minimum and where no change in the location and arrangement of the light source is necessary, the same light source being used for contact printing as well as for image photography. This is another object of the invention.

A further object of the invention is to provide a compact business machine that may form one of a bank of filing cabinets as it conforms in outward appearance thereto.

Several of the component parts herein described constitute improvements over like parts heretofore used for the same purpose, and irrespective of the fact that these improved parts are assembled and interconnected to form a complete apparatus for the purposes described. For example, the improved feeding mechanism herein described may be used anywhere where such feeding mechanisms are applicable, the improved interconnecting means between the platen mechanism and the camera per se may be used between any form of platen mechanism and any camera as well as with those shown. Therefore, further objects of the invention are to improve and cheapen the construction of the component parts.

The method of operation herein disclosed enables the camera to be operated in absolute synchronism with the platen by electrical means, thereby eliminating many of the aforementioned defects that arise in devices of this character where belt, gear and other mechanical drives are employed to interconnect the camera and platen mechanism, or feeding device.

This method further eliminates contact trouble in the controls, as by this method the current employed at the contact fingers operated by the sheets fed the device is negligible as compared with other methods.

Other objects and advantages of the method will more fully hereinafter appear.

In the accompanying drawings which illustrate a preferred form of mechanism for carrying out this improved method or process:

Figure 1 is a front elevation of a complete cabinet with the units in place;

Figure 2 is a side elevation of Figure 1;

Figure 3 is a perspective view of the cabinet,

Figure 5:
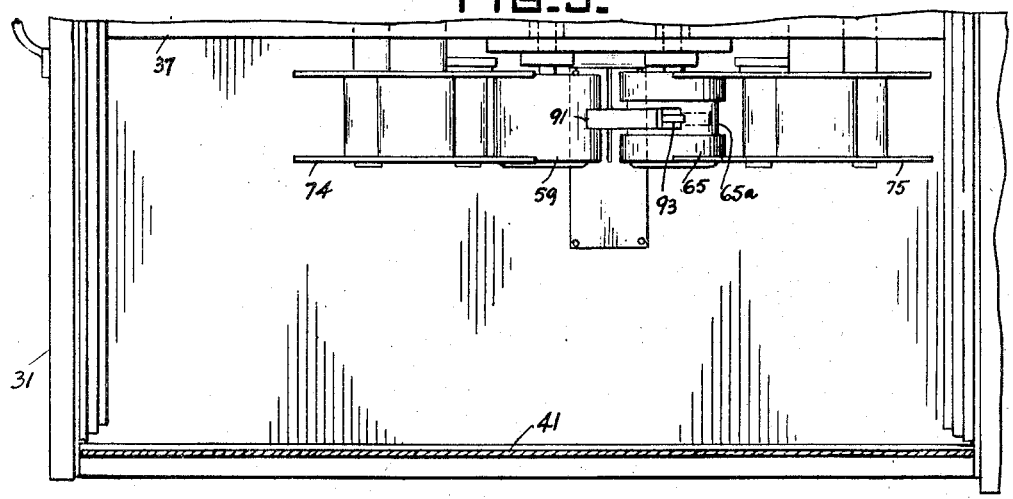
Figure 4:
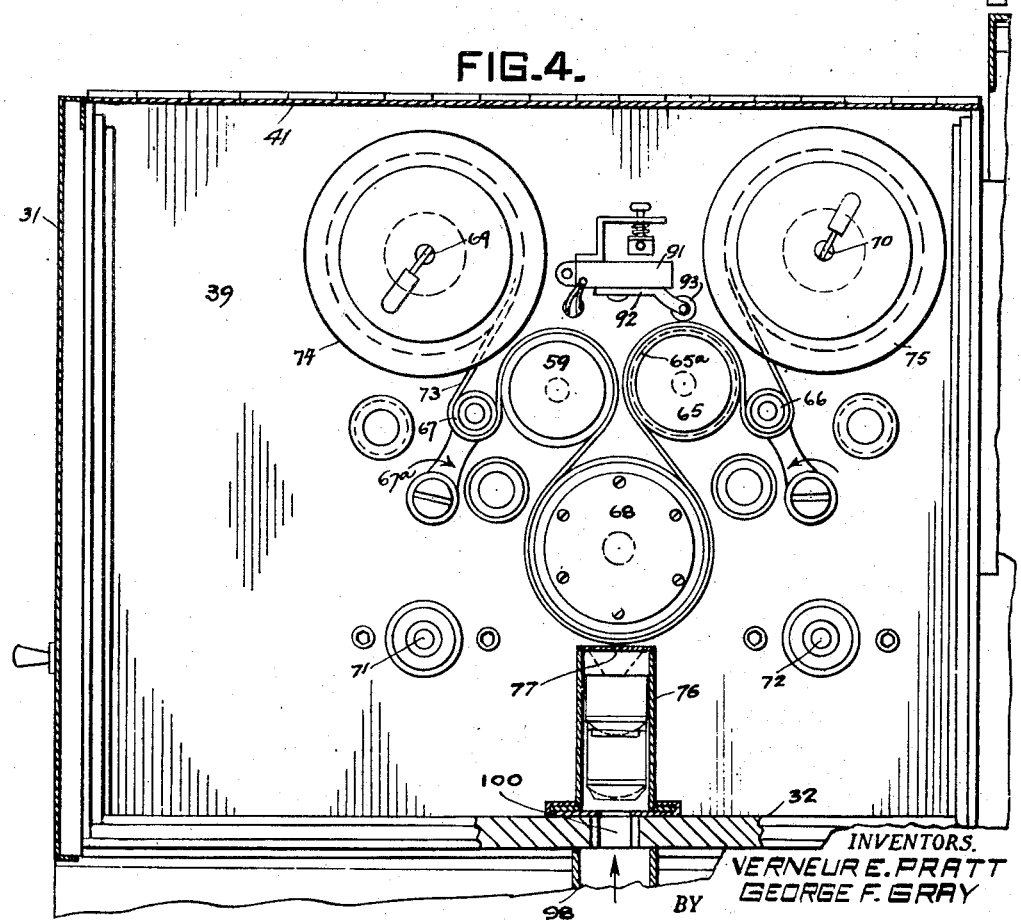
Figure 7:
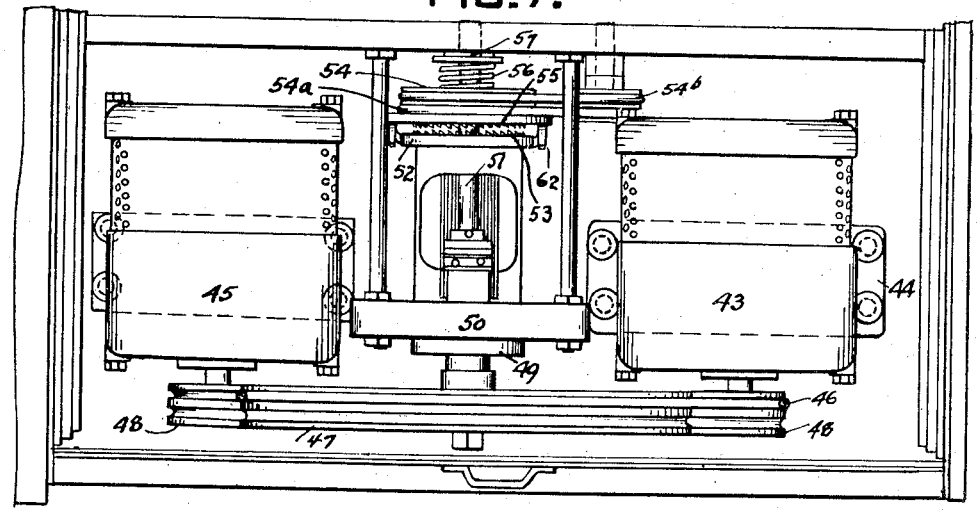
Figure 6:
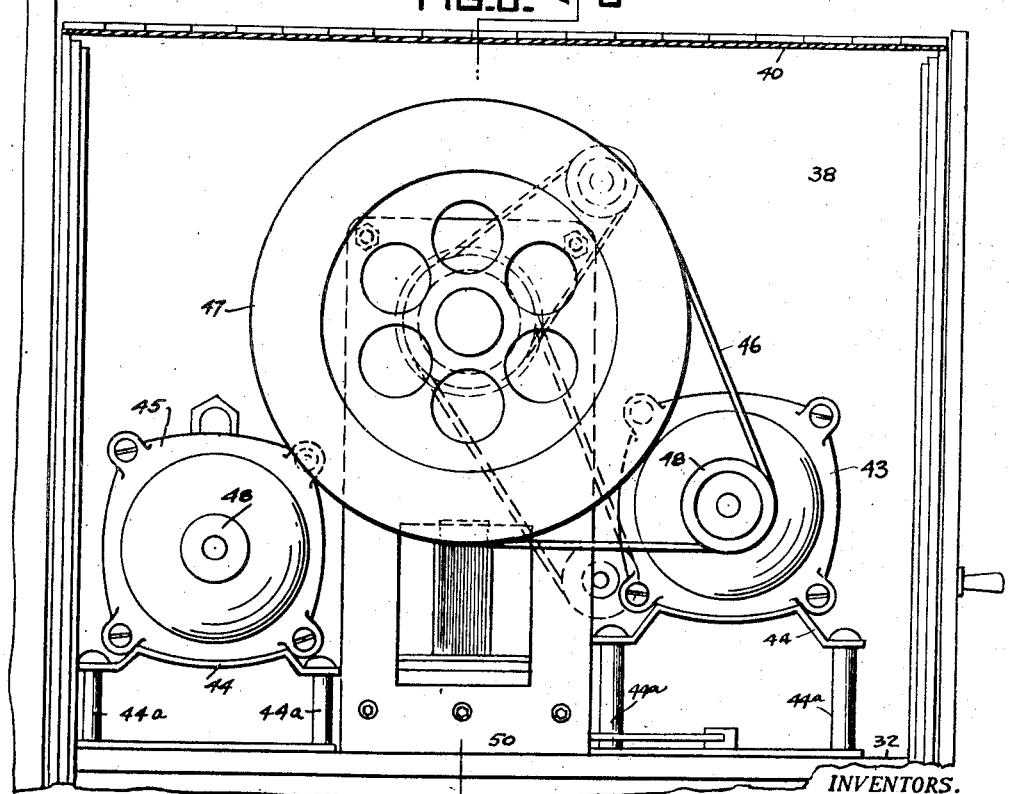
Figure 8:
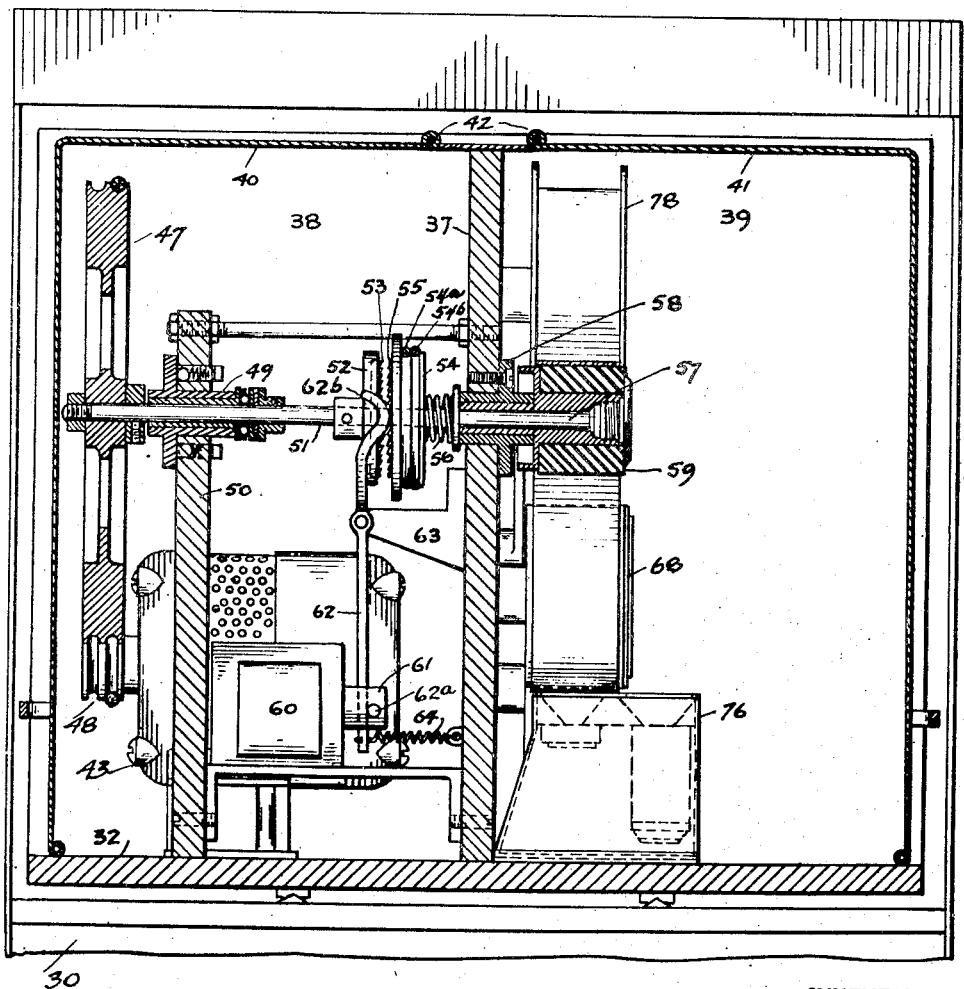
Figure 9:
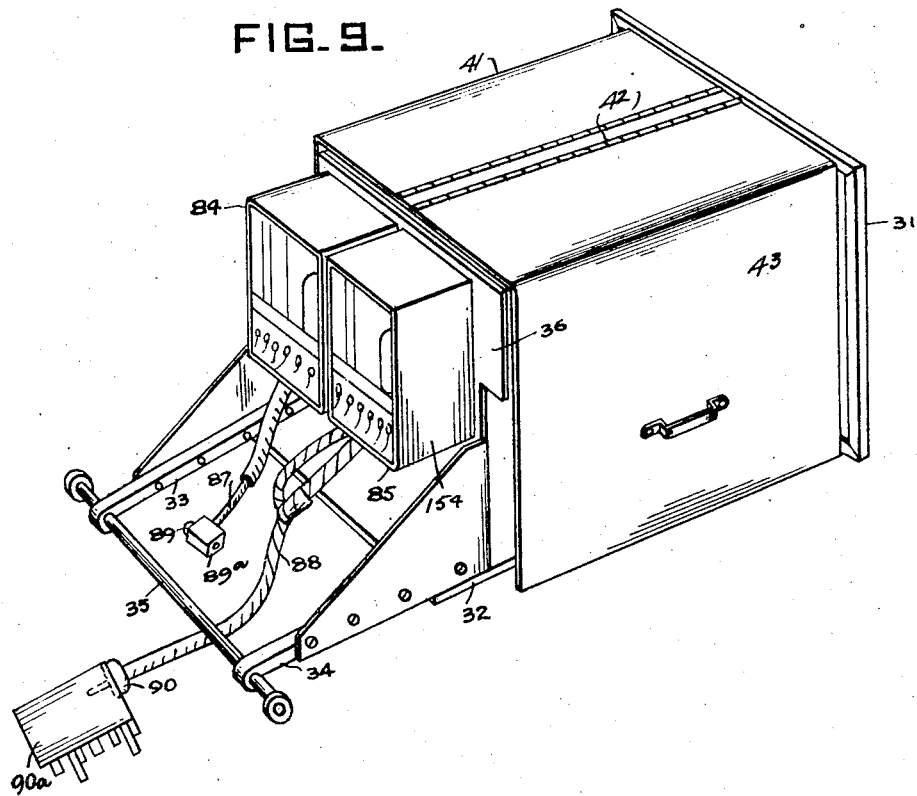
Figure 16:
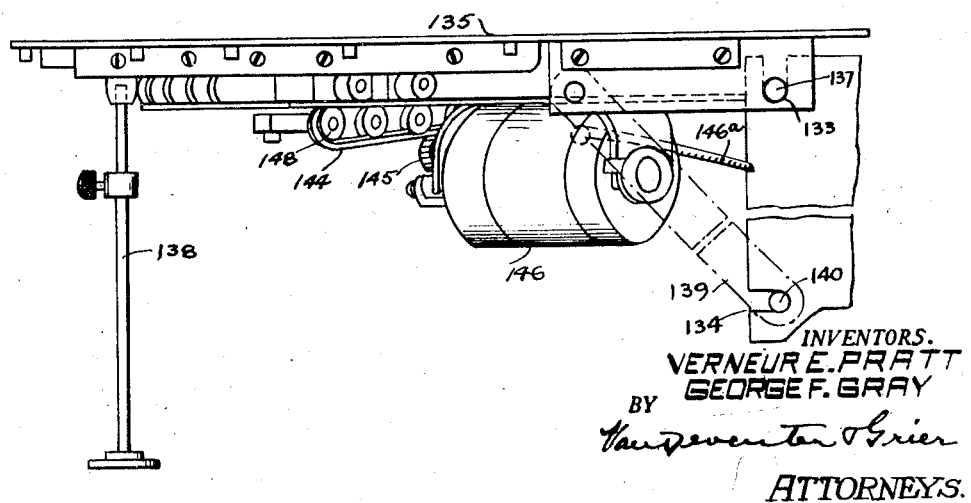
Figure 10:
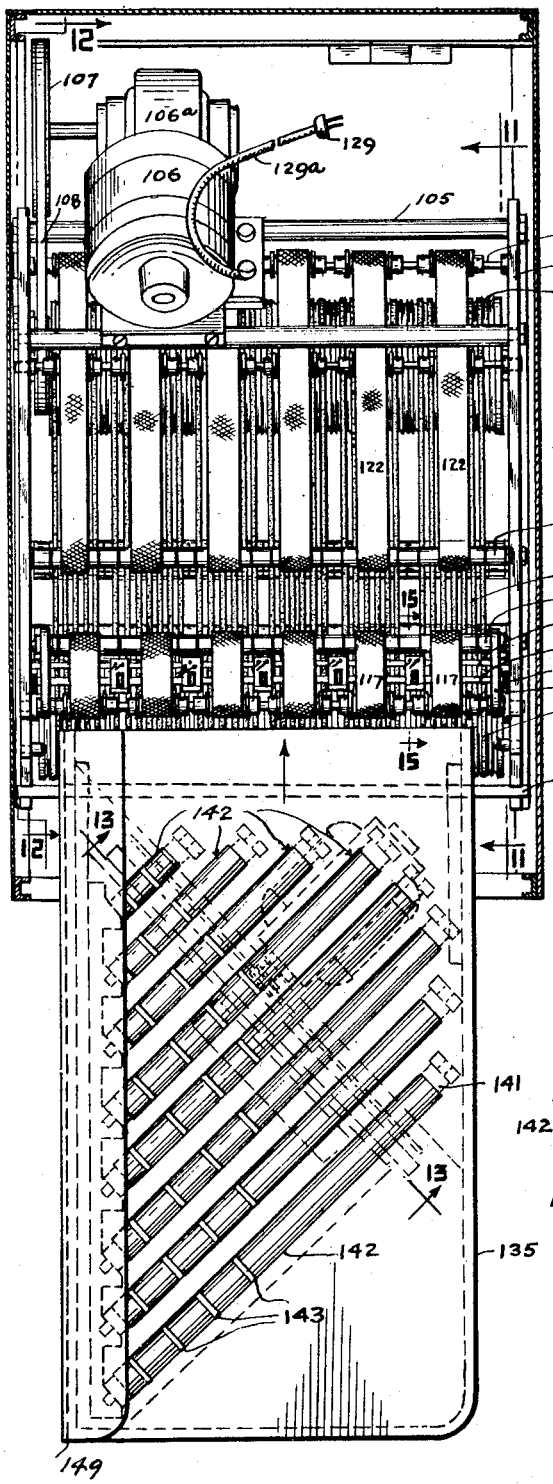
Figure 15:
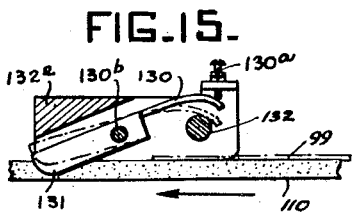
Figure 13:
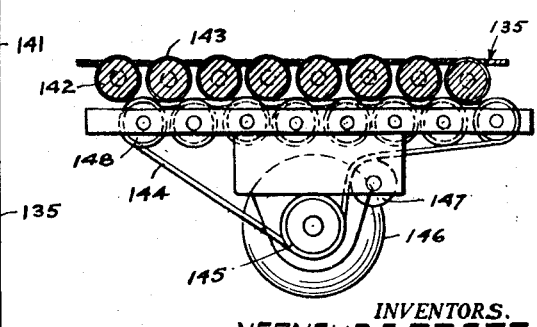
Figure 12:
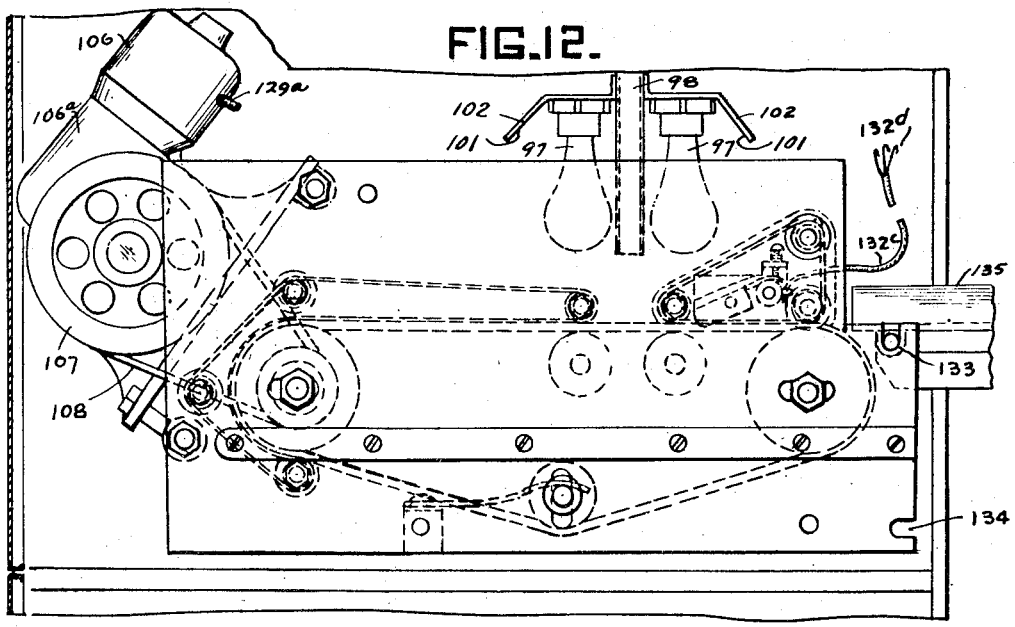
Figure 18:
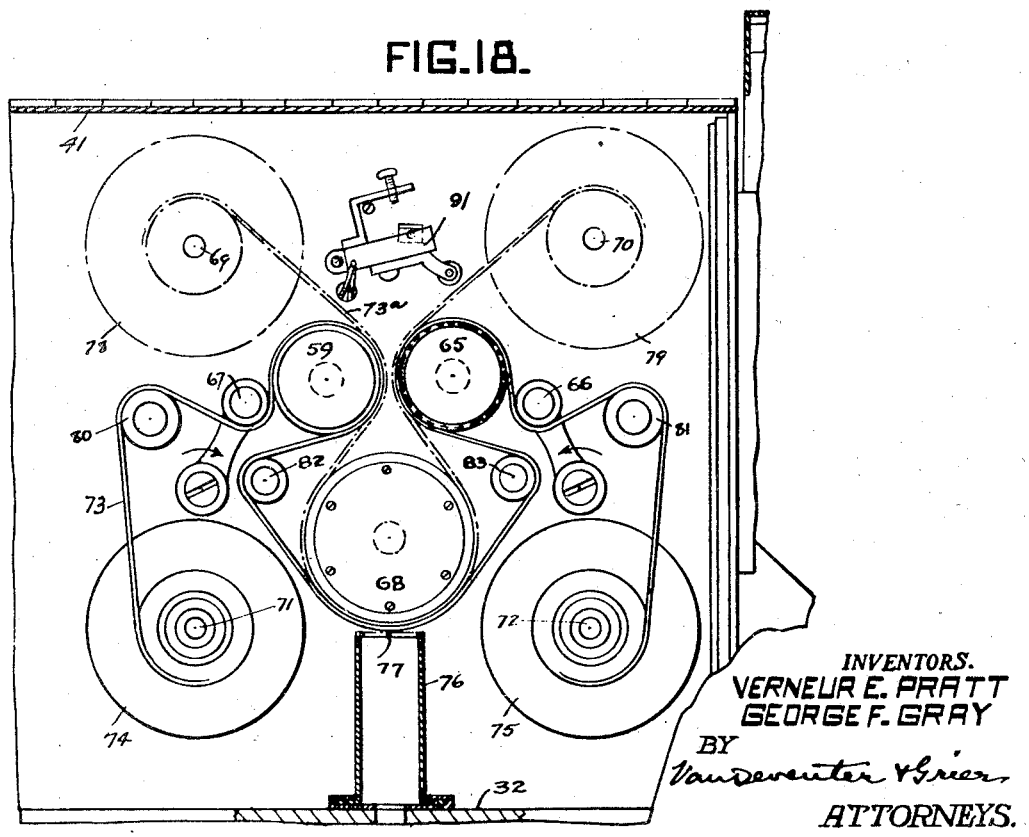

Figure 1, with feed table in place and the cabinet open for use;

Figure 4 is a sectional view of the camera unit on the line 4—4, Figure 1;

Figure 5 is a plan view of Figure 4, on line 5—5, Figure 1;

Figure 6 is sectional view of the camera unit on line 6—6, Figure 1;

Figure 7 is plan view of Figure 6 on line 7—7, Figure 1;

Figure 8 is sectional view on line 8—8, Figure 6;

Figure 9 is perspective view of the camera unit removed from the cabinet;

Figure 10 is a plan view of the feeding and platen units on line 10—10, Figure 2;

Figure 11 is enlarged longitudinal sectional view on the line 11—11, Figure 10;

Figure 12 is side elevation, sectional view on line 12—12, Figure 10;

Figure 13 is sectional view on line 13—13, Figure 10;

Figure 14 is under plan view of feed table only, Figure 10;

Figure 15 is a sectional view of a feed finger, on line 15—15, Figure 10;

Figure 16 is side elevational view of the feed table;

Figure 17 is perspective view of an alternate form of feed table;

Figure 18 is a diagrammatic drawing of the camera used as a contact printer;

Figure 19 is side elevation of the light tunnel unit;

Figure 20 is cross sectional view on line 20—20, Figure 19;

Figure 21 is a diagram of electrical devices and circuits employed in the device; and Figure 22 is a diagram illustrating the flow of sheets through the device illustrated in the preceding figures.

Referring to Figure 1 the numeral 30 generally denotes a framework or cabinet which may be of the same general dimensions and appearances as an ordinary 3 or 4 drawer file cabinet so that it may be placed with other like cabinets in an office to present a uniform appearance. As the detailed construction of such cabinets is well known and may be varied within wide limits, the cabinet construction will not be referred to in detail.

*Camera unit and driving mechanism therefor*

The upper unit or drawer contains the camera and its driving and control mechanism. The unit has a suitable framework carrying the parts hereafter mentioned, and as shown in Figure 9, these may comprise the front 31, the base 32 having rearwardly extending frame members 33, 34 supporting the rear wheel carriage generally denoted by the numeral 35. A plate 36 at the rear of the assembly is provided to act as a closure for the unit and upon this plate some of the electrical control mechanism may be mounted, although these control devices can be mounted on the other units of the device if desired. The front base, frame members, carriage assembly and rear plate are secured together in any suitable manner.

A longitudinal vertical mounting plate 37 extends from the front 31 to the rear plate 36 and may be secured to these plates and to the base 32. This plate divides the unit into two compartments indicated at 38, 39 in Figure 8. The compartment 38 contains the driving and clutch control mechanism for operating the camera, and compartment 39 contains the film reels, drive and guide rollers, film drums and lens mounting.

Covers 40, 41 are hinged at 42 to the mounting plate 37 (or attached to the unit in any suitable manner) and extend over and close the compartments 38, 39 as shown in Figures 8 and 9 and these covers can be made sufficiently close fitting to prevent the entrance of light to either or both the compartments 38, 39.

The camera driving mechanism comprises a suitable motor 43 which may have a built-in gear reducer if desired. Such gear reducer usually employs worms and can be made free from back lash. The motor is preferably a synchronous motor for reasons hereinafter stated and is mounted upon the base 32 or in any suitable manner. A mounting bracket 44 is shown in Figure 6 and may be sufficiently resilient to act as a vibration damper to eliminate vibration and noise and it will be understood that any form of resilient mounting may be used. The posts 44ᵃ may be of rubber to aid in reducing vibration.

If desired, a second resiliently mounted motor 45 may also be employed having a different speed from motor 43. This is desirable when using the camera as a contact printer. By moving the driving belt 46 from one motor to the other the speed of the film can be changed.

While it is obvious that more than one speed can be obtained from a single motor by the interposition of suitable mechanical speed reducers between the motor and the driven pulley 47, such devices are complicated, noisy, introduce backlash and are usually more expensive than two motors.

The motors are provided with driving pulleys 48 over either of which the belt 46 passes to the driven pulley 47 on shaft 51 supported in bearing 49 in the bracket 50 secured to the base 32 and plate 37 as shown in Figure 7.

Shaft 51 has secured to its inner end, the driving member 52 of a clutch having a plurality of teeth 53 on its engaging face. The laterally movable driven member 54 of the clutch also has teeth 55 on its engaging face and is urged to the left, Figure 8, by a compressed spring 56 carried on a shaft 57, the clutch end of which is splined to slidably support the member 54 to be rotatably driven thereby.

The clutch construction here shown is merely by way of illustration, and any suitable clutching mechanism may be employed.

The shaft 57 extends through the plate 37 and is supported in a suitable bearing 58 therein and carries on its outer end in the compartment 39, the film drive roller 59.

A suitable electrically operated clutch operating device such as the solenoid 60 has a plunger core 61 having a pin 62ᵃ engaging the arm 62 supported on the bracket 63 mounted on plate 37. This arm has a forked end 62ᵇ which rests on the outer flange of the driven member 54 of the clutch which is thereby held out of engagement (against the urge of spring 56) with the driven member 52 when the core 61 of the solenoid is in the position shown in Figure 8, the solenoid being energized. The arm 62 is connected at its lower end to the tension spring 64 so that when the clutch members 52, 54 are brought into engagement by spring 56, which occurs when the solenoid is de-energized, the core 61 via pin 62ᵃ is pulled outwardly by arm 62 and spring 64 so as to be in position for re-operation. The belts 54ᵃ, 54ᵇ drive the usual take-up pulleys on the film take-up reels.

The camera mechanism in compartment 39 as shown in Figure 4 comprises the film drive roller 59 and a plurality of film guide rollers 65, 66, 67 and the film drum 68, these guide rollers and the drum being mounted on stub shafts extending from the plate 37, the rollers 65, 66, 67 and drum 68 being freely rotatable on said shafts.

Film reel supports 69, 70, 71, 72 are provided for the reception of the usual film reels 74, 75 and any light sensitive medium such as the film 73 may be taken from reel 74 passed over the guide roller 67, which has a spring (not shown) urging it in the direction of the arrow 67ᵃ around drive roller 59, drum 68, roller 65, roller 66 (which is spring-pressed like 67) and finally wound up on reel 75. The latter reel may—by its supporting shaft 70 or in any other suitable manner—be driven in usual manner to take up slack film as it is unwound from reel 74.

The camera mechanism just described is merely illustrative; any suitable mechanism may be employed to unwind the film continuously past the lens.

The lens tube 76 is slidably mounted on the base 32 so as to be easily removable from the compartment 39 and contains a suitable lens adapted to project an image on the film 73 where same passes a slot 77 in the upper end of the lens tube.

Camera unit used as a printer

When used as a printer, the negative film 73 is arranged as shown in Figure 18, the reels 74, 75 being mounted on the lower shafts 71, 72 and the positive film reels 78, 79 being mounted on the upper shafts 69, 70. Guide rollers 80, 81, 82, 83 are provided for the negative film which is supported thereon so it will be held out of contact with the positive film 73ᵃ except on a section of the surface of drum 68 above the slot 77. This arrangement of the films permits them to be unwound together and carried past the slot 77 for exposure, without relative slippage, the exposure being made by reason of the light passing up the lens tube (the lens having been removed or a suitable lens being used) and through the slot 77 and through negative film 73 to expose positive film 73ᵃ.

Removability of camera unit

On the rear plate 36, Figure 9, are mounted the casings 84, 85 of electronic control 154 and its associated relays. These parts and others such as the motors 43, 45 are wired and connected to the circuits of the device as shown in Figure 21, the circuits to the unit section containing the camera and driving mechanism therefor, terminating in one or more cables 87, 88 provided with quick detachable multiple pin-and-socket connectors 89, 90 of any suitable type. The cables 87, 88 are long enough so that when the unit is pulled forward—like a drawer—out of the cabinet 30, the connectors are made accessible and can be separated and the unit may then be completely withdrawn from the cabinet. It will be noted there is no mechanical connection such as a belt or driving shaft between this unit and other units or parts of the device, which other parts may remain undisturbed in the cabinet when this unit is removed. Therefore, in case of trouble with the camera unit or its driving mechanism, these parts can be easily removed by the most inexperienced person without disconnecting any wires. The quick detachable connections can only be fitted together in the correct position, so it is impossible to reconnect them improperly.

If desired the socket receptacles 89ᵃ, 90ᵃ for connectors 89, 90 may be fixed on the framework of the unit so that when the unit is in its normal place in the cabinet, the connections will be automatically completed. As the details of such an arrangement are obvious, it is not here described in detail.

A switch 91 is mounted at some convenient place, such as on the plate 37 (Figure 4) and has an arm 92 carrying a small roller 93 which normally bears on the surface of the film 73. One of the rollers such as 65 is grooved as shown at 65ᵃ in Figure 5 and the film 73 has a hole in it near its inner end into which the roller 93 may drop, the groove 65ᵃ permitting it to do so. This operates the buzzer 160 to be presently described.

Control unit and light source

Cabinet 30 (Figures 1, 2 and 3) may be provided with a door 94 simulating the fronts of two of the file drawers and located immediately below the camera unit just described. The control unit 95 is positioned immediately behind this door, and the control unit may be removed from the cabinet the same as the camera unit, that is to say, it may slide in and out of the cabinet like a drawer carrying with it its associated equipment, or it may be secured in the cabinet by means of screws as shown at 96.

The panel 95 carries the various switches, rheostat, and other equipment hereafter described in connection with the electrical circuits and also carries electric lamps 97 arranged on each side of the light tunnel 98. The light tunnel, as shown in Figures 19 and 20 is positioned above the sheet 99 to be photographed, and the rectangular tunnel extends across said sheet the full width of the platen. For example, if the machine is designed to handle papers 8½ x 11 inches, such as ordinary letter sheets, the tunnel will extend across the 8½ inch dimension. The lamps are so positioned that the sheet is illuminated in the zone 116 (Figure 11) immediately below the light tunnel.

The upper end of the tunnel 98 terminates directly below the lens tube 76 as shown in Figure 4 so that the lens in this tube may scan the illuminated surface of the sheet 99. An aperture 100 is provided in the base 32 of the camera unit to permit light to pass therethrough when the units are in place in the cabinet.

The lamp circuit and all other circuits in the control unit terminate in quick detachable connectors whereby the unit may be disconnected and withdrawn from the cabinet the same as described in connection with the camera unit, and it will be understood that the control unit may have a suitable framework like that described and shown in connection with the camera unit, Figure 9.

In order to utilize all of the light produced by the lamps 97, the surface 101 adjacent said lamps may be made reflecting; that is to say, it may be a suitable mirror having apertures adapted to receive the lamp bases. These mirrors may extend downwardly at each side of the lamp unit, as indicated at 102, Figure 20, in order to reflect as much light as possible downward on the sheet 99.

Platen unit

The platen unit is mounted immediately under the control unit and may have a front 103 simulating one of the drawers of the file cabinet, or may be covered by the door 94. This unit has a framework similar to the camera unit, Figure 9, and is slidable in and out of the cabinet 30 the same as the camera unit. Side plates of the unit are shown at 104 (Figure 11). These side plates are suitably spaced apart by tie rods 105, and between these side plates the platen mechanism is mounted.

This mechanism comprises the driving motor 106 which may have a suitable gear reduction mechanism 106ª to drive the pulley 107 at suitable speed, and this through belt 108 drives the pulley 109, the shaft of which carries a plurality of suitable pulleys on which there are a plurality of endless belts 110 which pass over a pulley 111 at the outer end of the unit. Individual take-up pulleys 112 spring-pressed downward at 113 may be used to take up the slack in each belt 110 so as to keep it tight and flat across the guide rollers 114, 115 so that the upper surfaces of the belts at the point 116 will form a rigid traveling support for the sheet 99 to be photographed.

At the forward end of this unit and in contact with the belts 110 there are a plurality of idler belts 117 passing over the pulleys 118, 119 and 120, the two forward pulleys 118, 119 are mounted in a sub-frame 121 which swings around the axis of the pulley 120 as shown in dotted lines, Figure 11. The belts 117 are in frictional contact with the belts 110 and are driven thereby so that a sheet 99 fed into the front of the platen unit will be grasped by the belts 110 and 117 and carried across the space 116 below the light tunnel 98. As the sheet continues to travel to the right, Figure 11, it will be grasped by idler belts 122 carried by the pulleys 123, 124, 125 and 126. Belts 122 are in frictional contact with the belts 110 and the paper 99 will therefore be grasped by belts 110 and 122 and carried around the drive pulley 109 between the belts 110 and 122 and emerge at the point 127, and drop into the storage compartment 128 located in the bottom of the cabinet 30.

The motor 106 is provided with a flexible connecting cord 129ª having a quick-detachable plug 129 so that when the entire unit is drawn forward to remove it from the cabinet 30 the electrical connection can be broken to permit the entire unit to be withdrawn without disconnecting any wires. If desired, a receptacle for plug 129 can be mounted to automatically receive 129 when the unit is pushed into the cabinet.

In order to control the operation of the platen unit so that it will only operate when sheets 99 are passing through the device, a plurality of switch, feed or contact fingers 130 are mounted on a transverse shaft 130ᵇ at the forward end of the machine as shown in Figure 10. These fingers 130 are so designed and constructed that they lie between the belts 110 and normally occupy the position shown in Figure 15 with their lower ends 131 below the upper surface of the belts. Each finger is individually movable. When the forward end A, Figure 22, one dimension of a sheet 99 is fed into the machine it will pass under the lower ends 131 of the fingers and raise one or more of the fingers to contact bus bar 132 insulatedly mounted in blocks 132ª, in the frame members. This contact 130 controls the circuits in a manner that will be presently described. This bar 132 has a flexible cable 132ᶜ and quick-detachable connections 132ᵈ so that this connection may be broken when withdrawing the platen unit from the machine. All of the fingers 130 are electrically connected via their supports 132ᵉ and shaft 130ᵇ and each finger has its own adjusting screw 130ª whereby the position of the end 131 thereof can be adjusted relative to the belts 110 and the sheets 99 supported thereby. When the rear end B of a sheet, Figure 22, is carried beyond—to the right of—the fingers, the circuit is opened.

Because of the electronic control to be presently described, the fingers 130 where they make contact with bar 132 do not carry any appreciable current (the current being in milli-amperes) which is advantageous as it eliminates arcing and pitting of the contacts and the need of frequent cleaning and adjustment necessary when such contacts are employed in circuits carrying much larger currents.

At the forward end of the platen unit side plates there are notches 133 and 134 to receive the supporting elements of the feeding unit which will now be described.

Feeding unit

The feeding unit (Figures 10, 11, and 16) comprises a table 135 having any suitable means such as the downwardly extending ears 136 adapted to engage the cross bar 137 which lies in the slots 133 of the platen unit and extends across the same. The table 135 is permitted a certain amount of lateral movement and adjustment by this type of mounting. If desired, the outer end of table 135 can be supported by means of the rod 138 or side braces 139 may extend down from each side of the table and terminate in pins 140 which engage the slots 134 of the platen unit.

Referring to Figure 10, the table 135 has a series of angular slots indicated at 141 in which are positioned a plurality of rollers 142. These rollers each have a plurality of resilient sections of rubber or the like indicated at 143 which sections project slightly above the upper surface of the table 135.

The rollers 142 are all in contact with a belt 144 (Figure 13) which passes over a pulley 145 driven by motor 146 and over a suitable take-up pulley 147. In order to hold this belt in contact with the under surfaces of all of the rollers 142, another set of rollers 148 is provided immediately below the belt, as shown in Figure 13.

The assembly of the two sets of rollers and the belt is such that all of the rollers 143 are rotated to feed sheets placed on the upper surface of the table 135 inward and to the left as shown in Figure 10, the rubber sections 143 of the rollers tending, because of the rollers being at the angle shown, to feed the sheets towards the left or guide side 149 of the table so that a small piece of paper, such as a check fed endwise through the machine, will (before it encounters the belts 110, 117 of the platen mechanism) be at the extreme left, thereby insuring that the feed table can always be set to properly register using the extreme left edge 149 thereof as a starting point or guide relative to the optical axis of the camera.

The motor 146 is provided with a flexible cord 146ª and a quick-detachable connection 146ᵇ. A suitable socket 150 for the connection 146ᵇ may be mounted in the control panel or on the forward end of the platen unit. This socket 150 is connected in circuit and controlled by switch 150ᵇ as hereafter described.

In the event that a motor driven feed unit as just described is not desired, a plain feeding table 151 may be substituted therefor and its manner of attachment and support may be the same as just described in connection with the motor driven feed unit.

It will be seen that the feeding unit can be so designed and constructed that when not in use it can be placed in the lower drawer 128 of the cabinet 30.

Circuits and operation

Figure 21 shows the circuits of the complete device and the method of operation will be readily understood from the following description taken in connection with the operation of the mechanism described in connection with the preceding figures.

The apparatus being connected and the various units being in place in the cabinet 30, the plug 152 is connected to a suitable source of current such as 110 volts, 60 cycle A. C. The main switch 153, which is a three pole, double throw switch has three positions. In the position shown all circuits are disconnected. When the switch is thrown upwardly to "camera" the following occurs:

If the motor driven feed table is in use, plug 146b has been inserted in the socket 150 and motor 146 will operate if feeder switch 150b is closed.

Motor 106 driving the platen mechanism is connected to the circuit via its quick-detachable plug terminals 129 and is therefore ready to operate.

The camera motor 43 connected to the circuit via its quick-detachable plug terminals 89 starts.

The thermionic tube or tubes in the electronic control 154 begin to warm up and the following operations can take place:

(a) The film 73 can be advanced by closing switch 86 in order to run off a protective leader on the film at the start or finish of a roll.

(b) The film 73 will advance and the lamps will light if any one of the fingers 130 is operated by a sheet 99 to close the circuit to bus bar 132 common to all fingers.

(c) The time delay feature to be presently described governs how soon after a sheet engages a finger 130 to close the circuit that the lights will respond, and how long after the sheet releases the finger to open the circuit the lights will remain on. This time delay is adjustable so that the spacing between successive exposures on the film can be controlled when changing from one lens and reduction ratio to another.

This time delay feature is brought about by the employment of the electronic control 154 which employs a suitable tube such as a 6SN7 twin triode amplifier each unit acting independently. The upper unit of this tube acts with immediate response both on "make" and "break" upon the opening or closing of the switch fingers 130 to energize the exposure counter relay 155 operating the counter 155a which may be any suitable form of electrically operated counter.

The lower unit of the tube performs two functions, the first is an electrical delay obtained by charging or discharging the condenser 156 through two resistances 157 and 158, because of the fact that the "make" or "break" operations must be accompanied by different relay times. However, as the "discharge" time is only a fraction of the "charge" time this requires the discharge to take place through a much lower resistance and permits the charge resistor 157 to be left in the circuit continually. In other words, the time rate of discharge is much greater than the rate of charge and the net effect is the time of discharge.

The dual tube circuit in the electronic timer must be used because the counter must count instantaneously each individual piece of paper fed to the machine, even though they are fed at a rate which may keep the lights on continuously, due to the delay circuit.

Upon a sheet 99 making contact with a finger 130 at "A," Figure 22, a time delay T—1 (time required to charge condenser 156) is inaugurated through resistor 157. At the end of this time delay period the grid "g" is charged and current flows in the plate circuit, energizing the magnet of the double throw relay 159 which de-energizes the camera clutch solenoid 60 allowing the clutch to engage, thereby initiating the camera operation. The relay 159 also energizes the lamp relay 160. Upon the clutch engaging, film begins to move and at the same time the lamps 97 come up to brilliance represented by interval T2. This time T2 results in the proper spacing between images on the film.

The sheet progresses until point B (rear end of sheet) releases finger 130 thereby opening the circuit at which time a time delay T3 is inaugurated. The time delay T3 is a function of the discharge of condenser 156 through 157 and 158 to ground. This delay keeps relays 159 and 160 closed and allows the sheet to progress completely across the photographic area 116 before the lights are extinguished and the film stops.

It can be seen, therefore, that the initial delay T1 and the final delay T3 are readily adjustable and independent of each other, although they are both operated through the one triad of the tube.

The buzzer 161 is normally open until the arm 92 with its roller drops in a hole in the film as previously described. When this occurs the buzzer will sound notifying the operator in time to allow protective wrappings to be made on the daylight-loading spool by means of the film advance switch 86.

When the camera is to be used as a printer, a piece of white paper is held at the start of the platen and switch 153 is turned to the upward "camera" position for an instant to draw the paper into the machine and under the exposure area 116. As soon as the paper is at this point switch 153 is turned to the down or "printer" position which disengages platen motor 106 leaving the sheet in the exposure area 116. This also disconnects the socket 150 and the motor 146 connected thereto and the camera motor 43, and starts the printer motor 48. Thus there is no chance of using the unit as a printer without a reflecting sheet under the exposure area.

The main circuit connection 152 may consist of the usual flexible cord and plug extending out of the cabinet 30 in any desired direction preferably from the bottom thereof and the cabinet may be provided with suitable ventilating holes at the top and bottom of the rear.

A motor driven fan 162 may be connected across the main circuit and located at any suitable place within the cabinet to provide circulation of cool air over the various parts of the apparatus so as to dissipate the heat of the lamps 97 and prevent it from becoming excessive. Air can be taken into the cabinet at the openings 164 and discharged at the top at 165. These openings can be in the rear of the cabinet if desired.

A rheostat 163 for controlling the brilliance of the lamps is preferably mounted on the front of the control panel as shown in Figure 3 and may have a dial graduated in a series of steps as shown whereby the lamps may be set for any desired brilliancy.

When the designations $P_1$, $P_2$, $P_3$ et cetera appear in Figure 21 it will be understood that these are as many as needed of the quick-detachable connections referred to during the preceding description of the apparatus. Obviously the nature and location of these connectors can be varied within wide limits without departing from the inventive concept herein disclosed.

In the study of Figure 22 it will be observed that the contact fingers 130 are placed sufficiently ahead of the platen mechanism to provide the time $T_1$ to permit charging the condenser 156 in the electronic control but that the counter 155a operates instantly as soon as the contact 130 is closed by the sheet 99. However, because of the time delay feature, the film 73 does not start until just before the forward edge "A" of the sheet 99 reaches the zone 116.

In the meantime the additional time element $T_2$ is provided in order to permit the lamps 97 to come up to full brilliancy before the forward part of sheet "A" reaches zone 116.

It will also be observed that this time element $T_2$ spaces the images on the film by a linear amount of film that can be run off in interval $T_2$ and that this is run off without having an image projected thereon, so that by adjusting this time interval, proper spacing of the film images can be obtained.

As the sheet 99 continues to travel to the right, Figure 22, film moves in the opposite direction and the relative rate of travel of the sheet and film is constant because the driving motors controlling the movement of both sheet and film are synchronous motors.

The time element $T_3$ is introduced in order to keep the device at work while the sheet 99 is passing across the zone 116. As soon as the rear end "B" of the sheet 99 permits the contact 130 to open, the circuits operate to stop the film and extinguish the lamps.

What is claimed is:

1. In a device of the character described, a vertical cabinet, a plurality of sets of spaced supports or slides disposed at several different levels within said cabinet, openings formed in said cabinet at said levels, a camera unit supported on one of said sets and adapted to be slidably moved from a normal position inside the cabinet via the opening at the level of said last set to a position accessible to an operator, a panel rigidly mounted on said unit, movable therewith and adapted to form the external closure for said last mentioned opening when said camera is slid to said normal position, said camera having its optical axis extending downwardly within the cabinet when the camera is in said normal position, and a platen unit slidably carried on another of said sets below said camera, said platen unit being adapted to move documents across said optical axis.

2. In a device of the character described, a vertical cabinet, a plurality of sets of spaced supports or slides disposed at several different levels within said cabinet, all of said sets extending in the same direction within said cabinet, openings formed in one wall of said cabinet at said levels, a camera unit supported on one of said sets and adapted to be slidably moved from a normal position inside the cabinet via the opening at the level of said last set to a position accessible to an operator, a panel rigidly mounted on said unit and movable therewith which forms a closure for said last mentioned opening when said camera is slid to said normal position, said camera having its optical axis extending downwardly within the cabinet when the camera is in said normal position, and a platen unit slidably carried on another of said sets below said camera and adapted to be slid outwardly from its normal position below said camera via another of said openings, said platen unit being adapted to move documents across said optical axis.

3. In a device of the character described, a vertical cabinet, a plurality of sets of spaced supports or slides disposed at several different levels within said cabinet, all of said sets extending in the same direction within said cabinet, openings formed in one wall of said cabinet at said levels, a camera unit supported on one of said sets and adapted to be slidably moved from a normal position inside the cabinet via the opening at the level of said last set to a position accessible to an operator, a panel rigidly mounted on said unit, flush with the end thereof, which forms a closure for said last mentioned opening when said camera is slid to said normal position, said camera having its optical axis extending downwardly within the cabinet when the camera is in said normal position, a platen unit slidably carried on another of said sets below said camera and adapted to be slid outwardly from its normal position below said camera, said platen unit being adapted to move documents across said optical path, and means on said cabinet adapted to be engaged by a document feeder for delivering documents to said platen unit.

4. In a device of the character described, a vertical cabinet, a plurality of sets of spaced supports or slides disposed at several different levels within said cabinet, openings formed in said cabinet at said levels, a camera unit supported on one of said sets and adapted to be slidably moved from a normal position inside the cabinet via the opening at the level of said last set to a position accessible to an operator or completely removed therefrom, said camera having its optical axis vertical, and including a downwardly directed lens, the field of view of which is defined by slit means fixedly positioned within said cabinet, said lens being adapted to be brought in registration with said slit means when said camera is moved into its normal position within said cabinet, a platen unit slidably carried on another of said sets below said camera, said platen unit being adapted to move documents across said field of view, and a motor included in said unit for driving said camera.

5. In a device of the character described, a vertical cabinet, a plurality of sets of spaced supports or slides disposed at several different levels and extending in the same direction within said cabinet, openings formed in one wall of said cabinet at said levels, a camera unit supported on one of said sets and adapted to be slidably moved from a normal position inside the cabinet via the opening at the level of said last set to a position outside the cabinet accessible to an operator, a panel on said unit which forms a closure for said last mentioned opening when the camera is slid into its normal position, said camera having its optical axis vertical, and including a downwardly directed objective lens, the field of view of which is defined by a funnel-shaped slit defining means fixedly positioned within the cabinet, said lens being in registration therewith when the camera is in its normal position within the cabinet, a platen unit slidably carried on another of said sets below said camera and adapted to be slid outwardly from its normal position via another set of openings, a document feeder carried on said cabinet in front of said platen for delivering documents thereto, electrical circuits including motors for driving said camera and said platen unit, and instrumentalities for controlling a source of illumination and said motors, and a panel positioned in another opening in said cabinet between said camera and said platen unit, said last panel carrying manual controls for said circuits and instrumentalities, whereby the latter are positioned at the fingertips of the operator feeding documents into said document feeder.

6. In a device of the character described, a vertical cabinet, a plurality of sets of spaced supports or slides disposed at several levels and extending within the same direction within said cabinet, rectangular openings formed in one wall of said cabinet and having their bottom edges slightly below said levels, a camera unit supported on the upper of said sets and including a driving motor, said camera normally having its field of view extending vertically downward within said cabinet, a control panel including switches, an illumination control mounted on another of said sets below said camera, platen mechanism mounted on a third of said sets below said control panel, said platen mechanism including a drive motor and adapted to receive sheets conveyed thereto and carry the same across the field of view of said camera, a light source behind said control panel for illuminating sheets on said platen as they pass through said field of view, a slit image defining light tunnel rigidly mounted in said cabinet, extending downwardly from said camera and limiting said field of view, the lower end of said light tunnel extending below said light source and terminating near said platen mechanism, engaging means mounted on said cabinet adjacent to the outer end of said platen mechanism, and a document feeder engaging said supports and positioned in front of said platen and adjacent to said control panel for delivering documents to said platen mechanism, whereby an operator feeding documents into said document feeder has said control panel at his fingertips.

7. In a device according to claim 6, in which a lower set of spaced supports or slides positioned beneath said platen mechanism forms a slidable support for a drawer adapted to receive and have stacked therein documents delivered to it by said platen mechanism after they have been exposed.

8. In a photographic device, a casing having at least one rectangular opening in a side wall thereof, and a pair of spaced slides extending inwardly from said opening, a unitary structure carried on said slides, said structure being in the form of a drawer and including; a horizontal base forming a support, a vertical panel secured to one end of said base and forming a front plate for said drawer, a vertical plate secured to said base in spaced relation to said panel, a second vertical plate mounted on said base and extending from said panel to said first vertical plate to divide the space between the latter into two compartments, hinged means secured to the top of said second plate, means mounted on and extending from one face of said second plate into one of said compartments for supporting and moving film, driving means mounted on the opposite face thereof and consequently positioned in the other of said compartments for operating said film moving means, said driving means extending through said second plate from the opposite face thereof and including a clutch for controlling said film moving means, a solenoid operatively connected to said clutch, said clutch and said solenoid being positioned in said second compartment, a cover connected to said hinged means and cooperating with said first plate, said panel and said base to form a closure for one of said compartments, a similar cover connected to said hinged means and forming a closure for the other of said compartments, and a handle secured to the outer face of said front plate to facilitate moving said structure along said slides.

9. In a photographic device, a unitary structure in the form of a drawer and including; a base forming a support, a vertical plate secured to said base intermediate the sides thereof, a front plate having its inner face secured to both one end of said support and to said vertical plate, a back plate and carrying a handle secured to both the other end of said support and to said vertical plate, whereby two separate compartments are formed, a hinge member mounted on said first mentioned plate, an L-shaped cover hinged to said hinge plate and adapted to cooperate with said front and back plates and said base to form a light-tight closure for one of said compartments, a second L-shaped cover hinged to said hinge plate and adapted to cooperate with said front and back plates and said base to form a light-tight closure for the other of said compartments, means mounted on one face of said vertical plate and extending into one of said compartments for supporting and moving film, driving means positioned in the other of said compartments and extending through said vertical plate for operating said film moving means, said driving means including a clutch also positioned in said second compartment, and a solenoid operatively connected to said clutch for controlling the moving of said film, said first cover being adapted to be used to gain access to said means for supporting and moving film without disturbing the mechanism in the other compartment, and said second cover being adapted to be used to gain access to the mechanism in said second compartment without disturbing said means for supporting and moving film.

10. In a device of the character described, a vertical cabinet having a plurality of openings formed in one wall thereof at different levels, a plurality of spaced supports or slides oppositely disposed in said cabinet, one set being provided with each of said openings, a camera unit supported on one of said sets and adapted to be slidably moved via said opening from a normal position inside the cabinet to a position accessible to an operator outside said cabinet, a panel rigidly mounted on said unit and adapted to form a closure for said last mentioned opening when said camera is returned to its normal position within said cabinet, said panel also forming one wall of a light-tight casing housing the camera and mechanism forming part of said camera unit, a second panel spaced apart from said first panel and forming the opposite wall of said light-tight casing, and a pair of oppositely disposed hinged covers cooperating with said panels to complete the enclosure of said light-tight casing, one of said covers being adapted to be raised to gain access to said camera, and the other being adapted to be raised to gain access to said mechanism.

11. In a device of the character described, a vertical cabinet having a plurality of openings formed in one wall thereof at different levels, a plurality of spaced supports or slides oppositely disposed in said cabinet, one set being provided with each of said openings, a camera unit supported on one of said sets and adapted to be slidably moved via said opening from a normal position inside the cabinet to a position accessible to an operator outside said cabinet, a panel rigidly mounted on said unit and adapted to form a closure for said last mentioned opening when said camera is returned to its normal position within said cabinet, said panel also forming one wall of a light-tight casing housing the camera and mechanism forming part of said camera unit, a second panel spaced apart from said first panel and forming the opposite wall of said light-tight casing, a third panel between said first and said second panels and substantially equally dividing the space between them, and a pair of oppositely disposed hinged covers cooperating with said panels to complete the enclosure of said light-tight casing, one of said covers being adapted to be raised to gain access to said camera, and the other being adapted to be raised to gain access to said mechanism.

12. In a device of the character described, a vertical cabinet, a plurality of sets of spaced supports or slides disposed at several levels within said cabinet, openings formed in said cabinet at said levels, all of said openings being disposed one above the other in one wall thereof, a control panel positioned in one of said openings and carrying illumination control means, a light tunnel and lamp unit fixedly positioned within said cabinet behind said panel and including a plurality of lamps disposed on either side of said light tunnel, said light tunnel being uniformly narrow along one vertical plane and being tapered along a second vertical plane at right angles to the first mentioned vertical plane, the upper end of said tunnel being substantially narrow and the lower end being substantially wide, a camera unit slidably supported on one of said sets and carrying a downwardly directed lens, said camera being adapted to be slidably moved from a normal position inside the cabinet with said lens in alignment with the upper end of said light tunnel to a position outside said cabinet and accessible to an operator, and a platen unit slidably carried on another of said sets below said light tunnel and adapted to be slid outwardly from its normal position below said light tunnel via another of said openings, said platen unit being adapted to move documents across the field of view of said camera as defined by said light tunnel.

VERNEUR E. PRATT.
GEORGE F. GRAY.

REFERENCES CITED

The following references are of record in the file of this patent:

UNITED STATES PATENTS

| Number | Name | Date |
|---|---|---|
| 2,001,598 | Caps | May 14, 1935 |
| 1,908,845 | Hopkins | May 16, 1933 |
| 1,994,091 | Shwartz | Mar. 12, 1935 |
| 2,206,396 | Glass et al. | July 2, 1940 |
| 2,300,625 | Martin | Nov. 3, 1942 |
| 1,413,245 | Trautman | Apr. 18, 1922 |
| 2,050,882 | FitzGerald | Aug. 11, 1936 |
| 1,966,348 | Hughey | July 10, 1934 |
| 1,912,708 | Hopkins | June 6, 1933 |
| 2,177,135 | Fassel | Oct. 24, 1939 |
| 1,794,091 | Nystrom | Feb. 24, 1931 |
| 2,251,570 | Hessert | Aug. 5, 1941 |
| 2,008,289 | Mathieu | July 16, 1935 |
| 2,066,876 | Carpenter et al. | Jan. 5, 1937 |
| 2,295,368 | Suomala | Sept. 8, 1942 |
| 2,291,006 | Stuart | July 28, 1942 |
| 1,912,708 | Hopkins | June 6, 1933 |
| 2,129,326 | Johnson | Sept. 6, 1938 |
| 1,344,896 | Jobke | June 29, 1920 |
| 1,976,346 | Hughey | Oct. 9, 1934 |
| 1,957,889 | Hopkins et al. | May 8, 1934 |
| 2,292,825 | Dilks, Jr. | Aug. 11, 1942 |
| 2,133,581 | Simmon | Oct. 18, 1938 |
| 2,335,956 | Oiler | Dec. 7, 1943 |